(12) United States Patent
Watanabe et al.

(10) Patent No.: US 11,835,136 B2
(45) Date of Patent: Dec. 5, 2023

(54) SEALING DEVICE

(71) Applicant: NOK CORPORATION, Tokyo (JP)

(72) Inventors: Toshiki Watanabe, Fukushima (JP);
Kokichi Hamamoto, Fukushima (JP);
Tomoaki Nishimura, Fukushima (JP);
Masayuki Tanida, Fukushima (JP)

(73) Assignee: NOK CORPORATION, Tokyo (JP)

( * ) Notice: Subject to any disclaimer, the term of this patent is extended or adjusted under 35 U.S.C. 154(b) by 0 days.

(21) Appl. No.: 17/439,704

(22) PCT Filed: Apr. 15, 2020

(86) PCT No.: PCT/JP2020/016599
§ 371 (c)(1),
(2) Date: Sep. 15, 2021

(87) PCT Pub. No.: WO2020/235270
PCT Pub. Date: Nov. 26, 2020

(65) Prior Publication Data
US 2022/0163117 A1    May 26, 2022

(30) Foreign Application Priority Data
May 20, 2019   (JP) ................................. 2019-094644

(51) Int. Cl.
*F16J 15/3232*    (2016.01)

(52) U.S. Cl.
CPC ................................. *F16J 15/3232* (2013.01)

(58) Field of Classification Search
CPC .... F16J 15/00; F16J 15/16; F16J 15/50; F16J 15/52; F16J 15/32; F16J 15/3204; F16J 15/3208; F16J 15/3212; F16J 15/3216; F16J 15/322; F16J 15/3232; F16J 15/3236

USPC ......................................................... 277/562
See application file for complete search history.

(56) References Cited

U.S. PATENT DOCUMENTS

2012/0299250 A1*  11/2012  Yamamoto ............. F16J 15/324
                                                                 219/121.85
2018/0209546 A1   7/2018  Nagahamaya et al.

FOREIGN PATENT DOCUMENTS

| JP | H05-08136 U | 2/1993 | |
| JP | H 058136 | * 2/1993 | ............... F16J 15/32 |
| JP | 2004-263797 A | 9/2004 | |
| JP | 2011-105913 A | 6/2011 | |
| JP | 3193242 U | 9/2014 | |
| JP | 2016-044687 A | 4/2016 | |

(Continued)

*Primary Examiner* — Nathan Cumar
(74) *Attorney, Agent, or Firm* — Harness, Dickey & Pierce, P.L.C.

(57) ABSTRACT

A sealing device capable of suppressing depletion of lubricant is provided. A sliding surface of a side lip 220 at a position away from a distal end of the side lip 220 is provided with a plurality of annular grooves 222 adjacent each other, each of all parts that form annular protrusions 223 between adjacent annular grooves 222 protrudes most at a center in a width direction thereof, with an amount of protrusion gradually decreasing with increasing separation from the center, and both sides of the center in the width direction are symmetric in shape. A tip portion of the sliding surface of the side lip 220 on the distal side of a region, which is provided with the plurality of annular grooves 222, is configured to make a planar contact with an end face of the annular member.

2 Claims, 4 Drawing Sheets

(56) References Cited

FOREIGN PATENT DOCUMENTS

WO       2017-051920  A1      3/2017
WO      WO-2017051920 A1  *  3/2017   .......... F16C 33/7823

* cited by examiner

SEALING DEVICE

CROSS-REFERENCE TO RELATED APPLICATIONS

This application is a National Stage of International Application No. PCT/JP2020/016599, filed Apr. 15, 2020 (now WO 2020/235270A1), which claims priority to Japanese Application No. 2019-094644, filed May 20, 2019. The entire disclosures of each of the above applications are incorporated herein by reference.

FIELD

The present disclosure relates to a sealing device that has a side lip.

BACKGROUND

A sealing device that is configured to seal an annular gap between a shaft and a housing that rotate relative to each other is known. For a sealing device that is used in a differential device, hub bearing, transmission and the like, a technique is known, in which a side lip is provided which is capable of sliding on an end face of an annular member fixed to a shaft, in addition to a seal lip that is capable of sliding on the shaft. A sealing device according to a conventional example is described with reference to FIG. 4. FIG. 4 is a schematic cross-sectional view of a sealing device according to a conventional example.

A sealing device 800 according to a conventional example is provided with a seal lip 810 and a dust lip 820 which are capable of sliding on a shaft, and a side lip 830 capable of sliding on an end face of an annular member fixed to the shaft. The side lip 830 is configured to prevent dust or mud water from entering into the device. Lubricant (grease) is applied on a sliding surface of this side lip 830. This effectively inhibits entrance of dust or mud water into the device.

In the sealing device 800 according to the conventional example configured as described above, the lubricant becomes depleted over time, whereby wear on the side lip 830 may be accelerated and noise may be generated.

CITATION LIST

Patent Literature

[PTL 1] WO 2017/051920
[PTL 2] Japanese Utility Model Application Laid-open No. H 05-8136
[PTL 3] Japanese Patent Application Laid-open No. 2016-44687
[PTL 4] Japanese Patent Application Laid-open No. 2004-263797

SUMMARY

Technical Problem

An object of the present disclosure is to provide a sealing device capable of suppressing depletion of lubricant.

Solution to Problem

The present disclosure adopts following means to achieve the object noted above.

The sealing device of the present disclosure is a sealing device configured to seal an annular gap between a shaft and a housing that rotate relative to each other, the sealing device including: a seal lip configured to slide on the shaft; and a side lip configured to slide on an end face of an annular member fixed to the shaft, wherein the sealing device is used in a state where lubricant is applied on a sliding surface of the side lip, the sealing surface of the side lip at a position away from a distal end of the side lip is provided with a plurality of annular grooves adjacent each other, each of all parts that form annular protrusions between adjacent annular grooves protrudes most at a center in a width direction thereof, with an amount of protrusion gradually decreasing with increasing separation from the center, both sides of the center in the width direction are symmetric in shape, and a tip portion of the sliding surface of the side lip on a distal side of a region, which is provided with the plurality of annular grooves, is configured to make a planar contact with an end face of the annular member.

According to the present disclosure, the side lip is provided with a plurality of annular grooves on the sliding surface, so that the side lip can retain lubricant in the plurality of annular grooves. The lubricant is allowed to move between the annular grooves, because the parts that form annular protrusions between adjacent ones of these annular grooves all protrude most at the center in the width direction, the amount of protrusion gradually decreasing with increasing separation from the center. Therefore, depletion of lubricant in some of the annular grooves can be suppressed. Moreover, the parts that form annular protrusions between adjacent ones of the annular grooves are all symmetric in shape with respect to the center in the width direction, so that imbalance in the directions of movement can be minimized when the lubricant moves between the annular grooves. This configuration can prevent depletion of lubricant in some of the annular grooves even more reliably. Moreover, a tip portion of the sliding surface of the side lip on the distal side of a region provided with the plurality of annular grooves is configured to make a planar contact with an end face of the annular member. Therefore, entrance of mud water or the like into this contacting part is inhibited, and lubricant is prevented from flowing out.

Preferably, in a state where no external force is acting, the sliding surface of the side lip, except for the region thereof provided with the plurality of annular grooves, is formed by a conical surface.

Advantageous Effects of the Disclosure

As described above, according to the present disclosure, depletion of lubricant can be suppressed.

DRAWINGS

DESCRIPTION OF EMBODIMENT

Modes for carrying out this disclosure will be described in detail hereinafter illustratively based on specific embodiments with reference to the drawings. It should be noted that, unless otherwise particularly specified, the sizes, materials, shapes, and relative arrangement or the like of constituent components described in the embodiments are not intended to limit the scope of this disclosure. The sealing device according to the present disclosure may be applied to a differential device, hub bearing, transmission, and the like.

Embodiment

Figure 1:
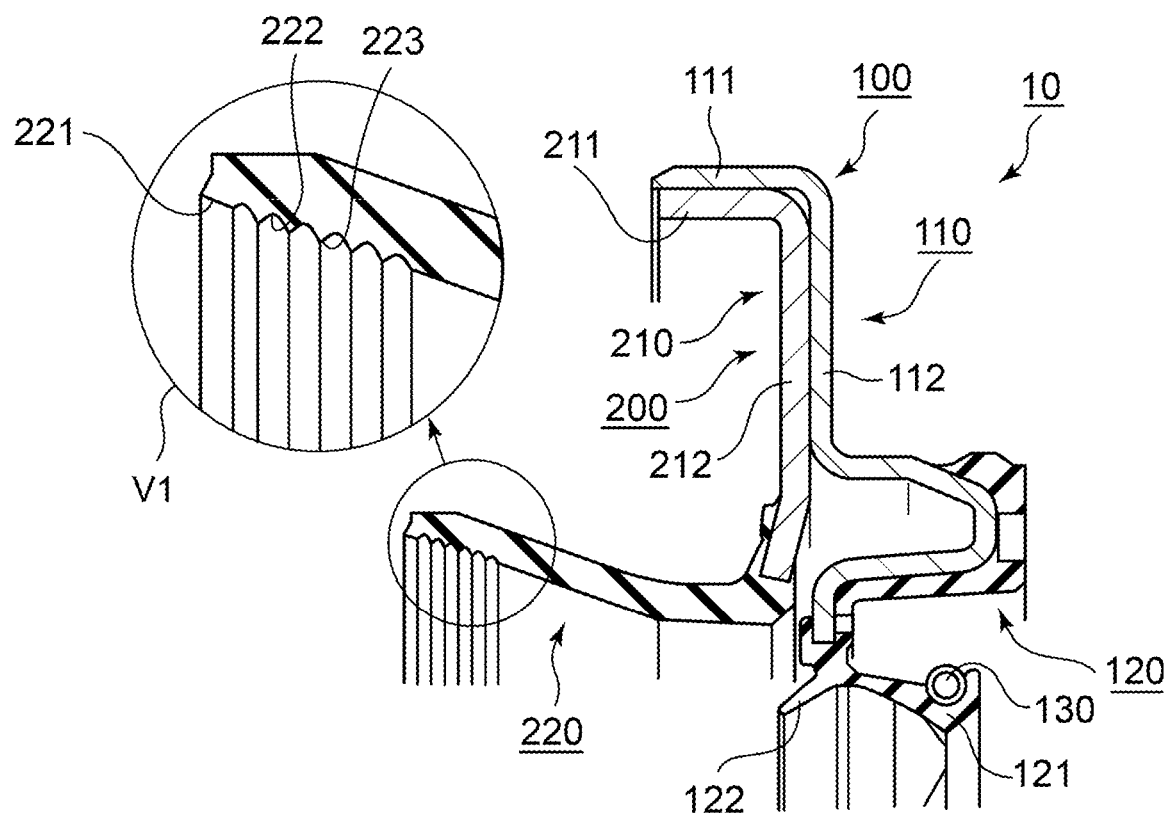
FIG. 1 is a schematic cross-sectional view of a sealing device according to one embodiment of the present disclosure.
Figure 2:
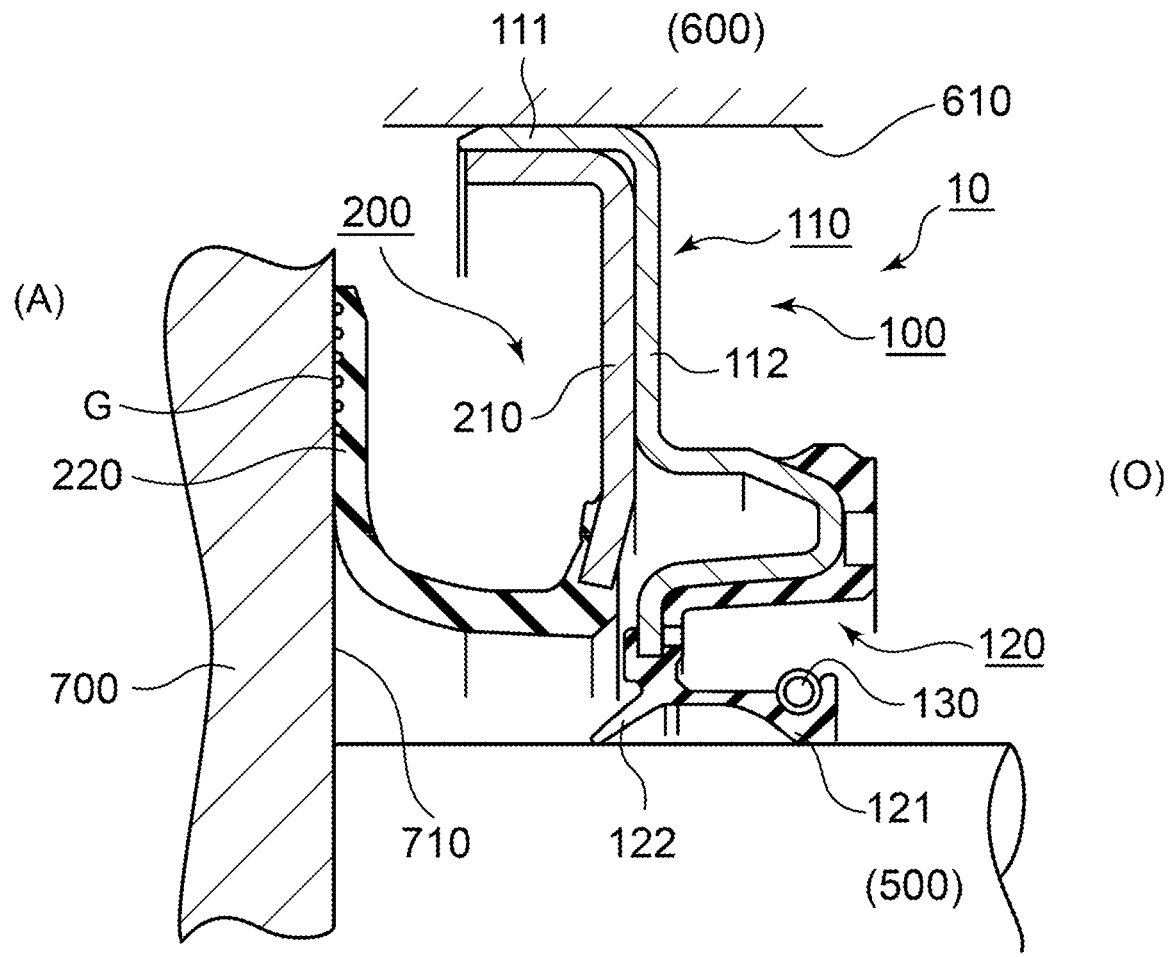
FIG. 2 is a schematic cross-sectional view of a sealing structure according to the embodiment of the present disclosure.
Figure 3:
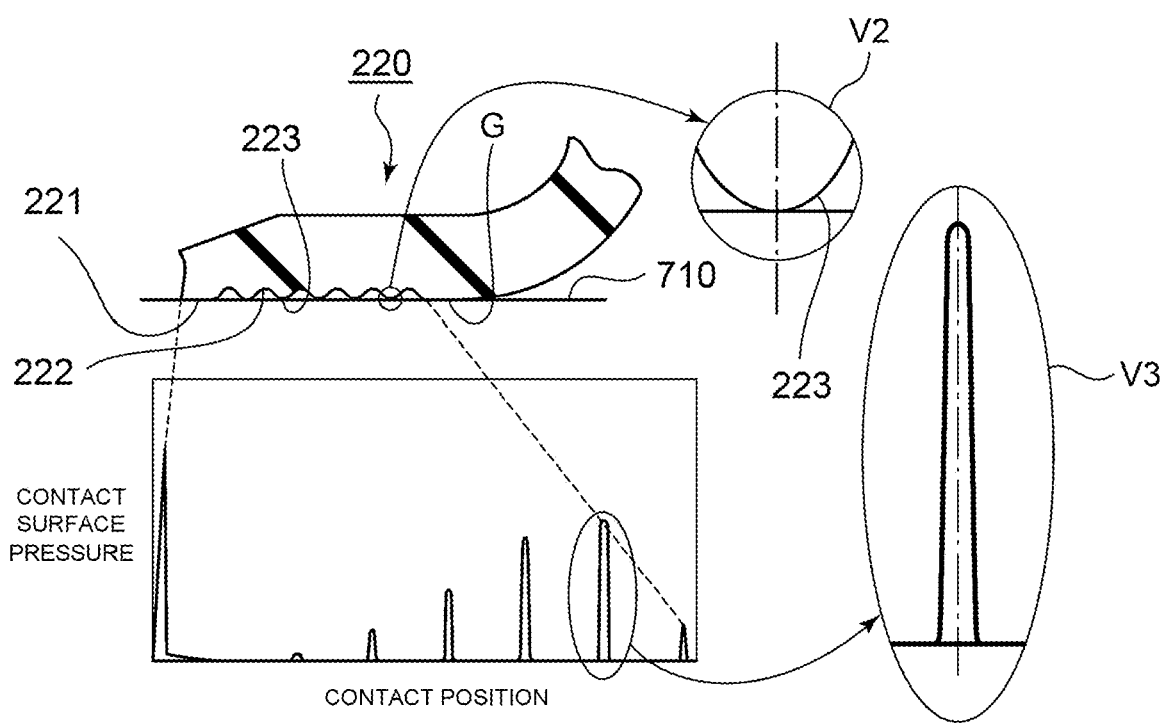
FIG. 3 is an illustrative diagram of a side lip according to the embodiment of the present disclosure.
Figure 4:
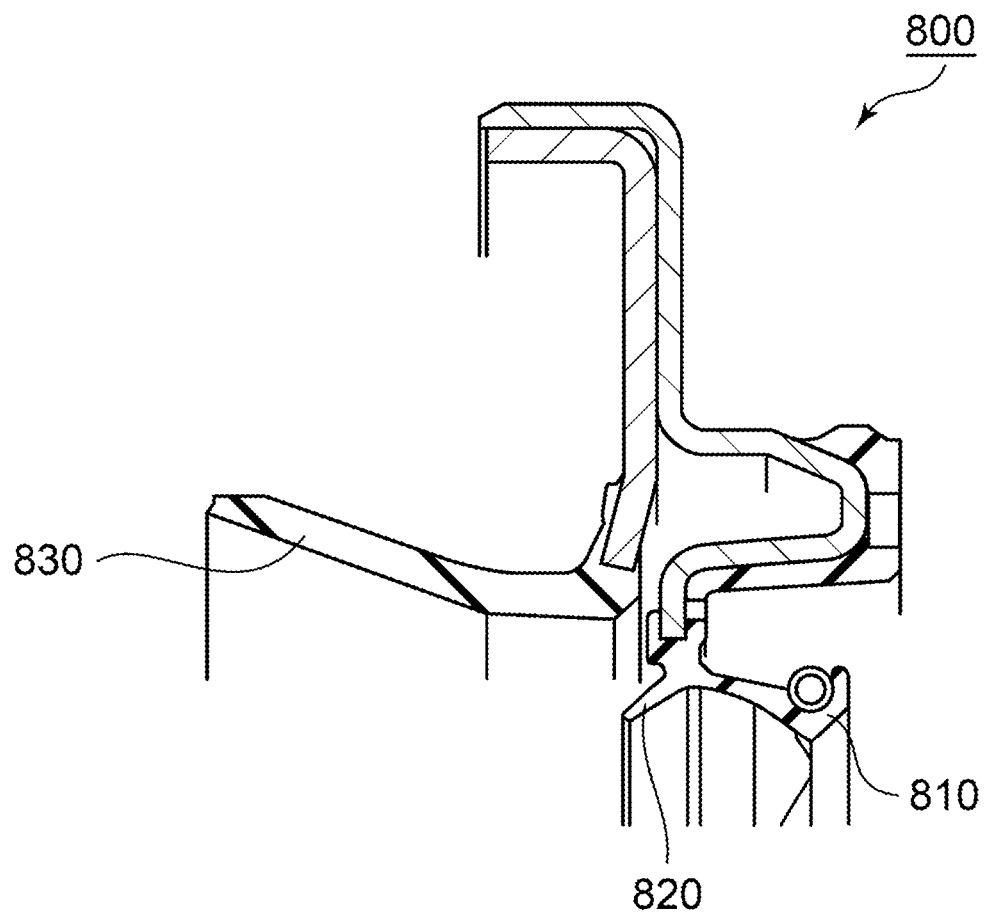
FIG. 4 is a schematic cross-sectional view of a sealing device according to a conventional example.

A sealing device according to one embodiment of the present disclosure is described with reference to FIG. 1 to FIG. 3. FIG. 1 is a cross-sectional diagram of the sealing device. FIG. 1 illustrates a cross section of the sealing device cut along a plane containing the center axis line of the sealing device. FIG. 2 is a schematic cross-sectional view of the sealing structure. FIG. 2 illustrates a cross section of the sealing device and others cut along a plane containing the center axis line of the sealing device and the shaft. FIG. 3 is an illustrative diagram of a side lip according to the embodiment of the present disclosure.

<Sealing Structure>

The sealing structure is described with reference, in particular, to FIG. 2. The sealing structure is configured by a shaft 500 and a housing 600 that rotate relative to each other, and the sealing device 10 that seals an annular gap between the shaft 500 and the housing 600. The sealing device 10 separates the annular gap between the shaft 500 and the housing 600, so that the sealed fluid such as oil on the sealed side (O) is prevented from leaking to the outside (A), and dust or mud water is prevented from entering from the outside (A) into the sealed side (O). An annular member 700 that rotates with the shaft 500 is fixed to the shaft 500. In a case where the sealing device (sealing structure) according to this embodiment is applied to a differential device, the annular member 700 corresponds to a deflector.

<Sealing Device>

The sealing device 10 is described in more detail. The sealing device 10 includes a first component 100 and a second component 200. The first component 100 is formed of a first reinforcing ring 110 made of metal or the like, and a seal main body 120 made of an elastic material such as rubber and formed integrally with the first reinforcing ring 110. The first reinforcing ring 110 includes a cylindrical part 111 fitted and fixed to an inner circumferential surface of a shaft hole 610 of the housing 600, and a body part 112 extending from one end of the cylindrical part 111 radially inward. The seal main body 120 is integrally provided to the radially inner side of the body part 112.

The seal main body 120 integrally includes a seal lip (main lip) 121 and a dust lip 122. The seal lip 121 extends from near the distal end of the body part 112 of the reinforcing ring 110 radially inward and toward the sealed side (O), and is capable of sliding on the shaft 500. A garter spring 130 is mounted on the radially outer side of the seal lip 121 to press the seal lip 121 radially inward.

The dust lip 122 extends from near the distal end of the body part 112 of the reinforcing ring 110 radially inward and toward the opposite side (toward the outside (A)) from the sealed side (O) and is capable of sliding on the shaft 500. The dust lip 122 mainly serves the function of preventing dust or mud water from entering into the seal lip 121 side.

The second component 200 is formed of a second reinforcing ring 210 made of metal or the like, and a side lip 220 made of an elastic material such as rubber and formed integrally with the second reinforcing ring 210. The second reinforcing ring 210 includes a cylindrical part 211 fitted to an inner circumferential surface of the cylindrical part 111 of the first reinforcing ring 110, and an inward flange part 212 extending from one end of the cylindrical part 211 radially inward. The side lip 220 is integrally provided near the distal end on the radially inner side of the inward flange part 212. The side lip 220 extends from near the distal end of the inward flange part 212 radially outward and toward the opposite side (toward the outside (A)) from the sealed side (O) and is capable of sliding on an end face 710 of the annular member 700. The side lip 220 serves the function of preventing dust or mud water from entering into the device (sealed side O). Lubricant (grease) G is applied on the sliding surface of the side lip 220. This effectively inhibits entrance of dust or mud water into the device.

<Side Lip>

The side lip 220 is described in more detail with reference, in particular, to FIG. 1 and FIG. 3. FIG. 1 illustrates a cross-sectional view V1 in a larger scale of an encircled part of the drawing (part near the distal end of the side lip 220). FIG. 3 illustrates an enlarged cross-sectional view of the side lip 220 in a state where the side lip 220 is in contact with the end face 710 of the annular member 700, and a diagram of relationship between the contact position and the contact surface pressure of the side lip 220 relative to the end face 710. FIG. 3 also illustrates a cross-sectional view V2 in an even larger scale of the contacting part between the side lip 220 and the end face 710, and an enlarged view V3 of the diagram of the contact surface pressure.

The sliding surface of the side lip 220 is provided with a plurality of annular grooves 222 adjacent each other at a position away from the distal end of the side lip 220. The parts that form annular protrusions 223 between adjacent ones of the annular grooves 222 all protrude most at the center in the width direction, the protruding amount gradually decreasing away from the center. Both sides of the center in the width direction are symmetric in shape (see the enlarged view V2 in FIG. 3). While the cross section of the annular protrusion 223 (cross section cut along a plane containing the center axis line of the sealing device 10) has a circular arc outer shape in this embodiment, the cross section of the annular protrusion may have a triangular outer shape, or an oval-circular outer shape. A tip portion 221 of the sliding surface of the side lip 220 on the distal side of the region, which is provided with the plurality of annular grooves 222, is configured to make a planar contact with the end face 710 of the annular member 700.

In a state where no external force is acting, the part of the sliding surface of the side lip 220 except for the region provided with the plurality of annular grooves 222 is formed of a conical surface (commonly known as tapered surface). That is, the tip portion 221 mentioned above, and a portion to be a sliding surface in a region on the proximal side of the side lip 220 with respect to the region where the plurality of annular grooves 222 are provided, are both formed by a conical surface. More specifically, the tip portion 221 and the portion to be the sliding surface in the region on the proximal side of the side lip 220 with respect to the region, which is provided with the plurality of annular grooves 222, are both located on the same imaginary conical surface. Moreover, the tips of all the plurality of annular protrusions 223 are located on the imaginary conical surface. In other words, on an inner circumferential surface of the side lip 220 formed of a conical surface (hereinafter referred to as "inner circumferential reference surface") are provided the plurality of annular grooves 222 as annular grooves recessed from the inner circumferential reference surface. Note that the present disclosure is not limited to this configuration. For example, the side lip may have a bent tip (see, for example, PTL 1 mentioned above). The inner circumferential reference surface of the side lip 220 may not be formed of a conical surface. For example, the inner circumferential reference surface of the side lip in a cross section cut along a plane containing the center axis line may have a smoothly curved shape instead of a straight line as in the case of the conical surface. Although the plurality of annular grooves 222 are formed to be recessed from the inner circumferential reference surface and the tips of the annular protrusions 223 between adjacent ones of the annular grooves 222 are located on the inner circumferential reference surface which is an imaginary conical surface in the above described embodiment, the tips of the annular protrusions may be located outside, or inside, of the inner circumferential reference surface, which may be an inclined surface rather than a conical surface as mentioned above, while the inner circumferential reference surface is an imaginary conical surface in the embodiment described above.

Advantages of Sealing Device According to this Embodiment

The side lip 220 of the sealing device 10 according to this embodiment is provided with a plurality of annular grooves 222 on the sliding surface, so that the lubricant can be retained in the plurality of annular grooves 222. The lubricant is allowed to move between the annular grooves 222, because the parts that form annular protrusions 223 between adjacent ones of these annular grooves 222 all protrude most at the center in the width direction, the protruding amount gradually decreasing away from the center. Therefore, depletion of lubricant in some of the annular grooves 222 can be prevented.

The parts that form annular protrusions 223 between adjacent ones of the annular grooves 222 are all symmetric in shape with respect to the center in the width direction as illustrated in V2 of FIG. 3. This makes the distribution of the contact surface pressure even on the left and right sides of the center where the surface pressure is highest as illustrated in V3 of FIG. 3. This suppresses imbalance in the directions of movement when the lubricant moves between the annular grooves 222. The details of this will be explained. The lubricant moves between the annular grooves 222 during operations that involves rotation of the annular member 700 with the shaft 500 or change in pressure between the side lip 220 and the end face 710 of the annular member 700 because of vibration in the axial direction or the like of the shaft 500. If the distribution of surface pressure on the annular protrusions 223 is asymmetric on the left and right sides, the lubricant moves over to the slope with a smaller surface pressure gradient more easily, and moves over to the slope with a larger surface pressure gradient less easily. Consequently, the lubricant will move to a certain direction on the annular protrusions 223, because of which the lubricant may be depleted in some of the annular grooves 222. In this embodiment, as described above, the surface pressure distribution provided by the annular protrusions 223 is even on the left and right sides, so that imbalance in the directions of movement of the lubricant is minimized. Therefore, depletion of lubricant in some of the annular grooves 222 can be prevented even more reliably.

Moreover, in this embodiment, a tip portion 221 of the sliding surface of the side lip 220 on the distal side of the region where the plurality of annular grooves 222 are provided is configured to make a planar contact with the end face 710 of the annular member 700. Therefore, entrance of mud water or the like into this contacting part is inhibited, and lubricant is prevented from flowing out.

Depletion of the lubricant can be suppressed by the sealing device 10 according to this embodiment. Since this in turn inhibits wear on the side lip 220, noise generation can be prevented, and the durability of the sealing device 10 can be improved.

(Others)

The sealing device of the present disclosure is applicable to various sealing devices having a seal lip and a side lip. Therefore, the present disclosure is applicable also to a sealing device having one reinforcing ring, for example, with a seal main body including the seal lip and the side lip in one piece integrally formed thereto.

REFERENCE SIGNS LIST

10 Sealing device
100 First component
110 First reinforcing ring
111 Cylindrical part
112 Body part
120 Seal main body
121 Seal lip
122 Dust lip
130 Garter spring
200 Second component
210 Second reinforcing ring
211 Cylindrical part
212 Inward flange part
220 Side lip
221 Tip portion
222 Annular groove
223 Annular protrusion
500 Shaft
600 Housing
610 Shaft hole
700 Annular member
710 End face

The invention claimed is:

1. A sealing device configured to seal an annular gap between a shaft and a housing that rotate relative to each other, the sealing device comprising:
a seal lip configured to slide on the shaft; and
a side lip configured to slide on an end face of an annular member fixed to the shaft, wherein
the sealing device is used in a state where lubricant is applied on a sliding surface of the side lip,
the sliding surface of the side lip at an intermediate position away from a distal end of the side lip is provided with a plurality of annular grooves adjacent each other and including annular protrusions between adjacent annular grooves, each of the annular protrusions have a width wherein a center of each of the annular protrusions in a width direction define a highest protruding portion of the annular protrusions, with an amount of protrusion gradually decreasing with increasing separation from the center of the annular protrusions, wherein both sides of the center of the annular protrusions in the width direction are symmetric in shape, and
a tip portion of the sliding surface of the side lip on a distal side of a region, which is provided with the plurality of annular grooves, is configured to make a planar contact with the end face of the annular member, wherein a portion on a proximal side of the side lip with respect to the region where the plurality of annular grooves are provided is configured to make a planar contact with the end face of the annular member, and the side lip is configured to slide on the end face of the annular member both with the intermediate portion with the annular grooves and the tip portion and the proximal portion without annular grooves.

2. The sealing device according to claim 1, wherein, in a state where no external force is acting, the sliding surface of the side lip, except for a region thereof provided with the plurality of annular grooves, is formed by a conical surface.

* * * * *